United States Patent [19]

Batzer

[11] Patent Number: 5,083,748
[45] Date of Patent: Jan. 28, 1992

[54] RADIAL-DIRECTED FLUID-PRESSURE-LOADED ALL-METAL-SEALED GATE VALVE

[75] Inventor: Thomas H. Batzer, Livermore, Calif.

[73] Assignee: Batzer Vacuum Technology Associates, Inc., Livermore, Calif.

[21] Appl. No.: 637,810

[22] Filed: Jan. 7, 1991

[51] Int. Cl.⁵ .................................. F16K 25/00
[52] U.S. Cl. ............................ 251/167; 251/198
[58] Field of Search ............ 251/158, 167, 175, 195, 251/197, 198, 199

[56] References Cited

U.S. PATENT DOCUMENTS

| | | | |
|---|---|---|---|
| 3,003,742 | 10/1961 | Kearns | 251/167 |
| 4,320,890 | 3/1982 | Meyer et al. | 251/167 X |
| 4,566,671 | 1/1986 | Besom | 251/167 X |
| 4,799,692 | 1/1989 | Batzer et al. | 277/34 |

*Primary Examiner*—John C. Fox
*Attorney, Agent, or Firm*—Henry P. Sartorio

[57] ABSTRACT

A large diameter gate valve uses a radially directed fluid pressure loaded all metal seal formed by engaging and disengaging a fixed and a moveable seal element. The fixed element is formed of a circular flange which contains a pressure chamber with a deformable wall, and is mounted to the valve body. The moving seal element contains an annular recess which mates with the circular flange, and is carried on a moveable sub-frame which moves on a frame fixed in the valve body. The valve opening defines an axis in a first direction, and the sub-frame moves through the valve body in a second direction which is substantially perpendicular to the first direction. The sub-frame and moveable seal element move in the second direction until the moveable element reaches a stop mounted in the valve body at which position the moveable element is aligned with but spaced apart from the fixed element. As the sub-frame continues to move in the second direction, the moveable element is forced to move toward and engage the fixed element. The pressure chamber in the flange is then pressurized to complete the seal.

18 Claims, 6 Drawing Sheets

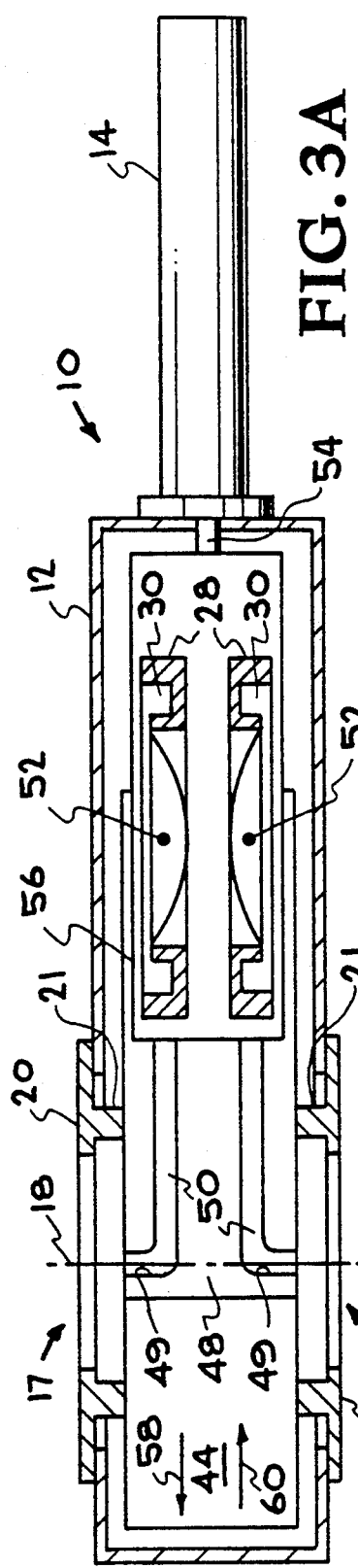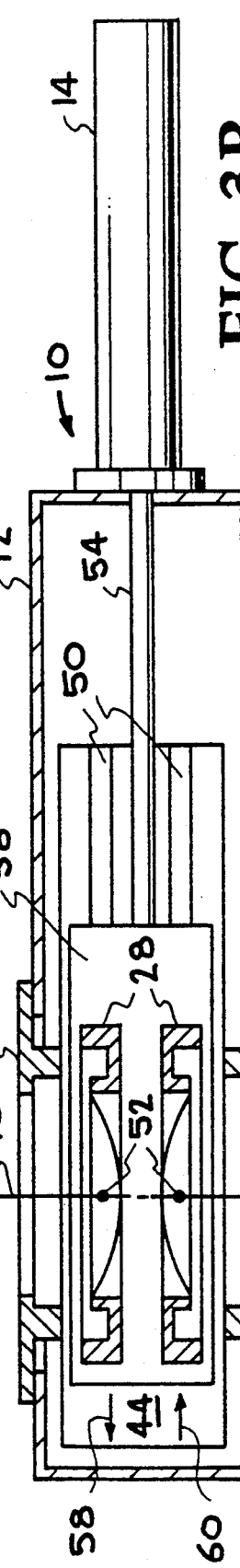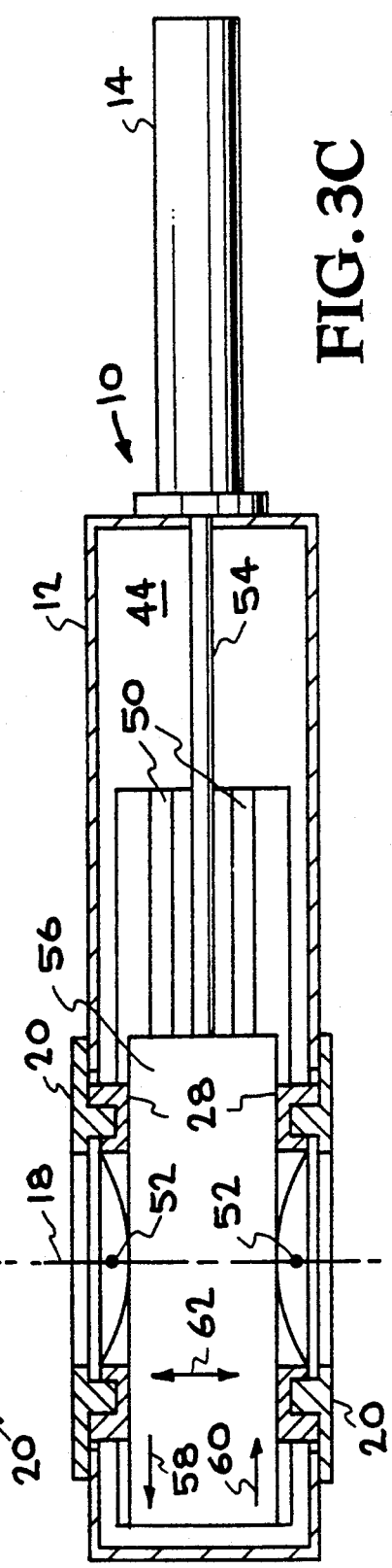

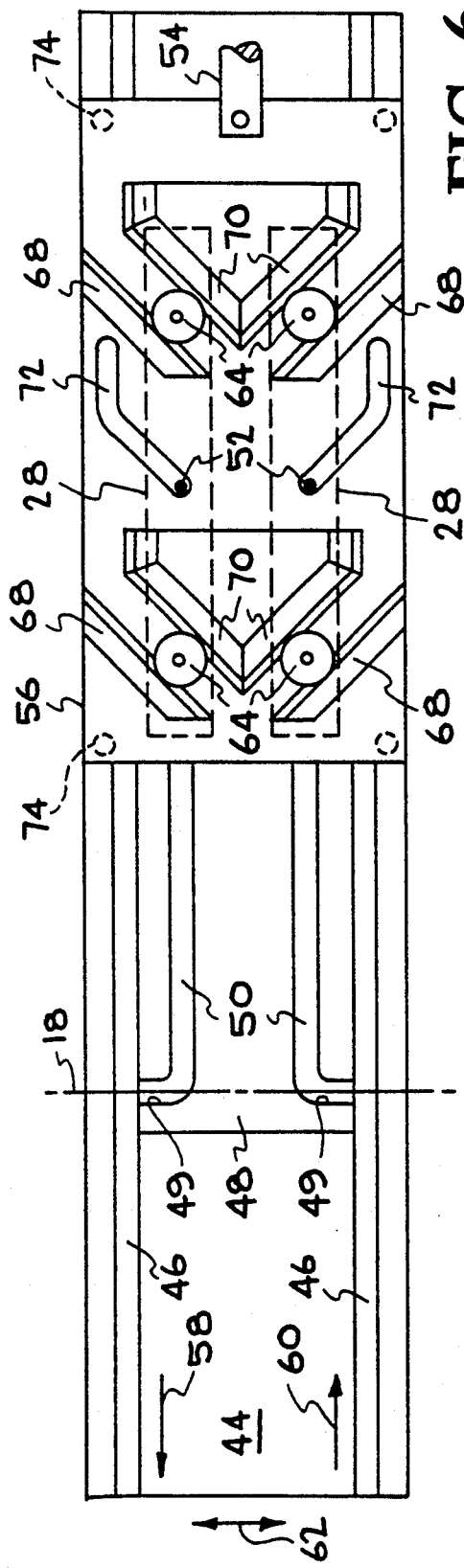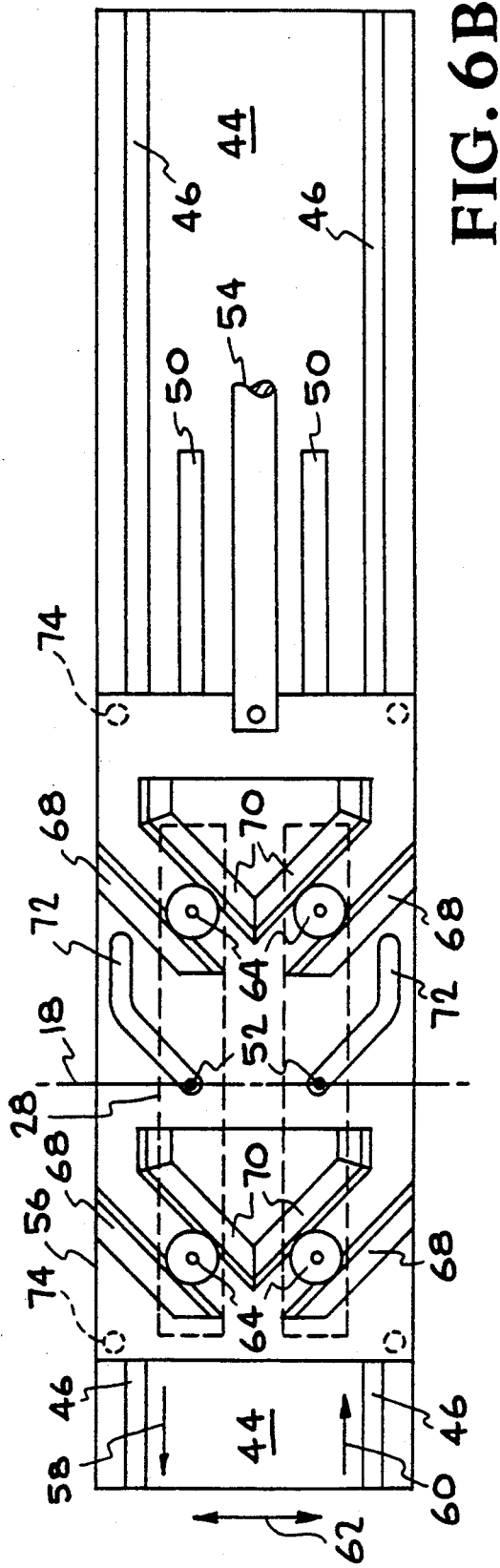

RADIAL-DIRECTED FLUID-PRESSURE-LOADED ALL-METAL-SEALED GATE VALVE

BACKGROUND OF THE INVENTION

This invention was made with Government support under Contract No. DE-AC03-87ER80537 awarded by the Department of Energy. The Government has certain rights in this invention.

The invention relates generally to valves for vacuum and high pressure systems, and more particularly to large valves with all metal seals for fusion reactors and industrial applications.

In vacuum and pressure systems, valves are needed for communication within the system. In use, the valve must provide a sufficient seal when closed, and should be relatively easy to open and close. An essential part of a valve is the seal. Many conventional seals are formed using a gasket. A material is placed between the sealed parts which are clamped together. In many applications under high pressure or temperature or radiation exposure, an elastomeric material is unsuitable. Metal gaskets also cause problems. In a permanent seal a gasket may be suitable. In a valve where the seal is opened and closed many times, the presence of any gasket material may result in leaks.

U.S. Pat. No. 4,799,692 to Batzer et al. issued Jan. 24, 1989 describes an all metal seal for vacuum or pressure vessels or systems. Fluid pressure in a chamber in a flange radially resses the flange wall against a side of a matched groove into which the flange fits to form a seal between the flange wall and groove wall.

In a fusion reactor, the valves are particularly important, for tritium containment and other operational and safety considerations. Large, up to 1 m diameter and greater, valves with long operational life are required; e.g., The International Thermonuclaar Experimental Reactor (ITER) requires twnety-four 1.5 m diameter valves. This type of valve would also be applicable in other areas such as the semiconductor manufacturing industry, where high purity and rapid operation are important, and in the ion implantation and toxic waste handling industries.

Scaling to large sizes is particular problem with many gate valve designs. Gate valves using axial loaded seals scale in weight exponentially with seal diameter due to the massive structure required to prevent warpage of the valve body and consequentially the sealing surface. The lifetime of the seal in repeated operation is also a significant factor particularly in valves where the probability of seal damage due to debris might cause early seal failure.

SUMMARY OF THE INVENTION

Accordingly, it is an object of the invention to provide an improved valve for fusion and other industrial applications.

It is also an object of the invention to provide a valve having a diameter up to 1 m or greater.

It is another object of the invention to provide a large scale valve whose weight scales nearly linearly with size.

It is a further object of the invention to provide a valve using a radial pressure seal.

It is another object of the invention to provide a valve with an all metal seal.

It is also an object of the invention to provide a valve with a long operational lifetime.

It is a further object of the invention to provide a valve useful for a vacuum or high pressure system.

The invention is a gate valve which forms a radially directed fluid pressure loaded all metal seal. The male seal element is formed of a circular flange which contains a pressure chamber with an elastically deformable wall, and is preferably fixedly mounted to the valve body. The female seal element contains an annular recess which mates with the flange of the male seal element, and is preferably carried on a moveable sub-frame which moves on a frame fixed in the valve body. The positions of the male and female elements could be interchanged.

The valve opening defines an axis in a first direction and the sub-frame moves through the valve body in a second direction which is substantially perpendicular to the first direction. The sub-frame and female element move in the second direction until the female element reaches a stop mounted in the valve body at which position the female element is aligned with but spaced apart from the male element. As the sub-frame continues to move in the second direction, the female member is forced by an arrangement of slots and tracks to move toward and engage the male element. The pressure chamber in the flange is then pressurized to complete the seal. The seal can be differentially pumped between a air of spaced raised lands formed on the sealing wall of the annular recess of the female element to greatly extend the life of the seal Large diameter valves, with diameters up to 1 m or greater, which are quick and easy to operate can be produced. A significant advantage of using a radial pressure seal in a gate valve is in scaling to large sizes. Since the radially loaded seals put no warping loads on the valve body, the weight of the valve scales nearly linearly with size.

BRIEF DESCRIPTION OF THE DRAWINGS

In the accompanying drawings:

FIGS. 3 A, B, C are sectional views of a dual gate valve in the open, intermediate and closed positions, respectively.

DETAILED DESCRIPTION OF THE PREFERRED EMBODIMENTS

Figure 1:
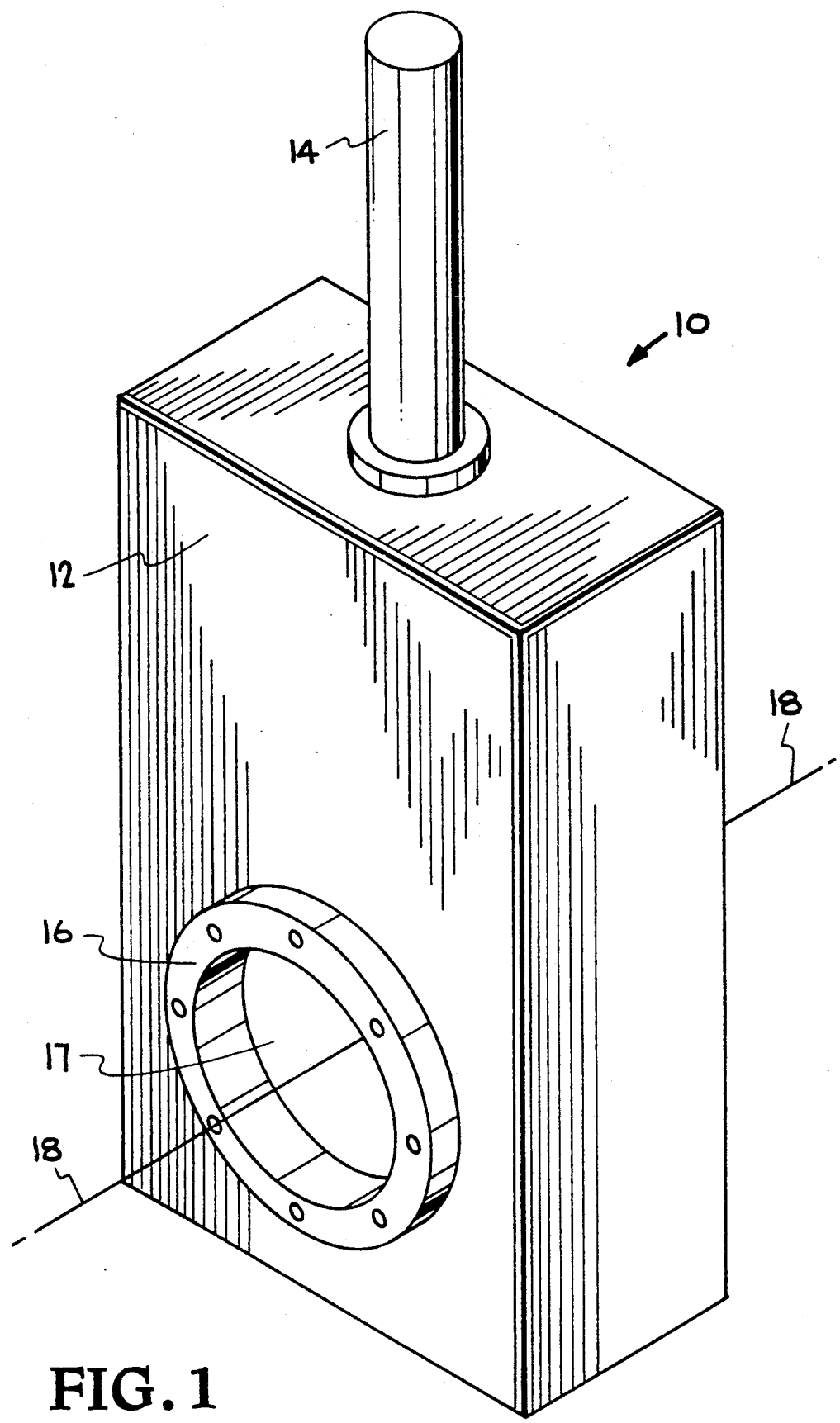
FIG. 1 is a perspective view of a valve body, showing the valve opening and the actuator.

As shown in FIG. 1, gate valve 10 is formed of a valve body or valve case 12 having a valve opening 17 therethrough. The valve opening is typically circular. An actuator 14 extends into valve body 12 for opening and closing the valve opening 17. A flange 16 extends around and out from opening 17 to allow the valve body 12 to be connected to pipes or other parts of the vacuum or pressure system. The opening 17, and a similar opening (not shown) on the opposed side of valve body 12, define an axis 18 through the valve body 12.

Figure 2A:
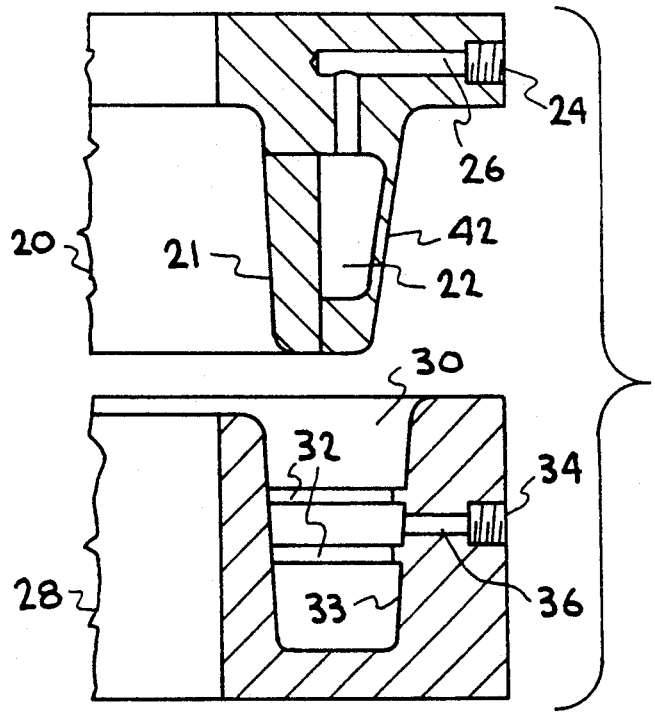
FIGS. 2 A, B, C are sectional views of the radially directed fluid pressure loaded all metal seals of the valve, in the separated, mated but unpressurized, and mated and pressurized positions, respectively.
Figure 2B:
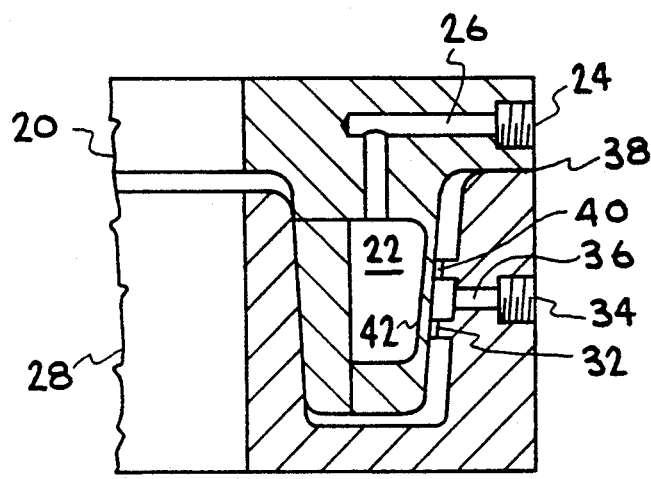
Figure 2C:
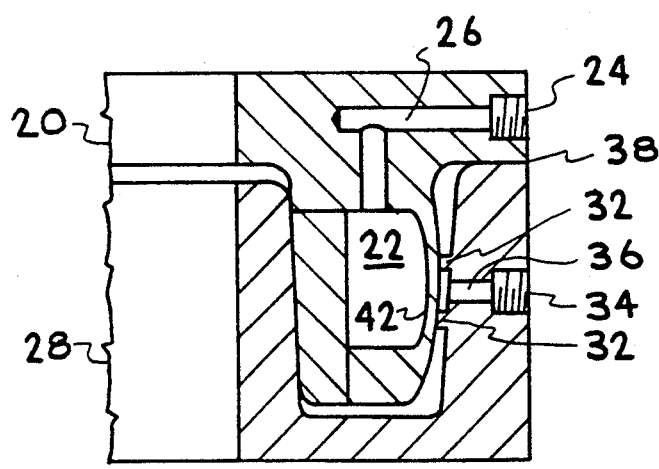

The gate valve according to the invention uses a radially directed fluid pressure loaded all metal seal, similar to that described in U.S. Pat. No. 4,799,692 which is herein incorporated by reference. As shown in FIGS. 2 A, B, C, the seal is formed of two mating elements 20, 28. The male seal element 20 is formed of a circular flange 21 which is preferably slightly tapered and contains an elastically deformable pressure chamber 22 with a radially deformable thin wall 42. A port 24 and a connecting passageway 26 allow pressurized fluid to be introduced into chamber 22 to effect the seal. The female seal element 28 contains an annular recess or groove 30 for receiving the flange 21 of the male seal element 20. Two raised lands or ridges 32 are formed on lateral wall 33 of recess 30. A port 34 and connecting passageway 36 communicate with the recess 30 through wall 33 between the two raised lands 32.

As shown in FIG. 2 B, the male and female seal elements 20, 28 are mated, with the surfaces 38 coming into contact to restrict further movement of the mating parts. The flange 21 of element 20 extends into recess 30 of element 28 with the pressure chamber 22 of element 20 positioned adjacent to the lands 32 of element 28. Since the seal is not pressurized at this time, there is a small gap or clearance 40 between the lands 32 in the recess 30 and the deformable thin wall 42 of pressure chamber 22.

As shown in FIG. 2 C, chamber 22 is pressurized by introduction of fluid through port 24 and passageway 26. Thin wall 42 deforms radially outward, closes the gap 40, and contacts the sealing lands 32. Port 34 and passageway 36 communicate with the volume enclosed by walls 33, 42 and lands 32 so the seal can be tested or the volume can be differentially pumped to provide greater seal reliability and lifetime. Alternately, in a non-differentially pumped embodiment, wall 33 has only a single land 32 which wall 42 contacts to form the seal As normally configured, the male element 20 is fixedly attached to the valve body so it does not move during operation of the valve; therefore, no flexible lines are needed to provide pressurized fluid to chamber 22. The female element 28 is translationally mounted within the valve body so that it can move in and out of contact with element 20; moveable element 28 can utilize a flexible low pressure line for checking operation of or differentially pumping the seal.

Figure 5:
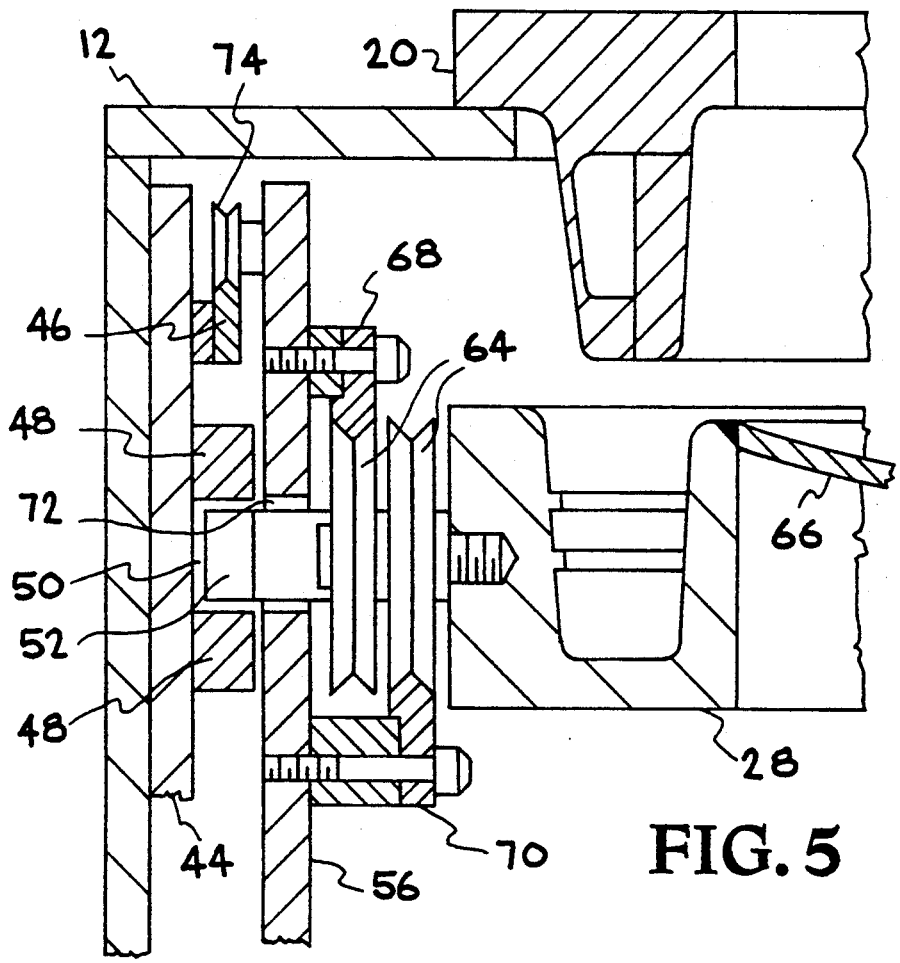
FIG. 5 is a sectional view of a portion of the valve body, showing the seal elements in the open position and the translation means for moving the female seal element into engagement with the male element.
Figure 6C:
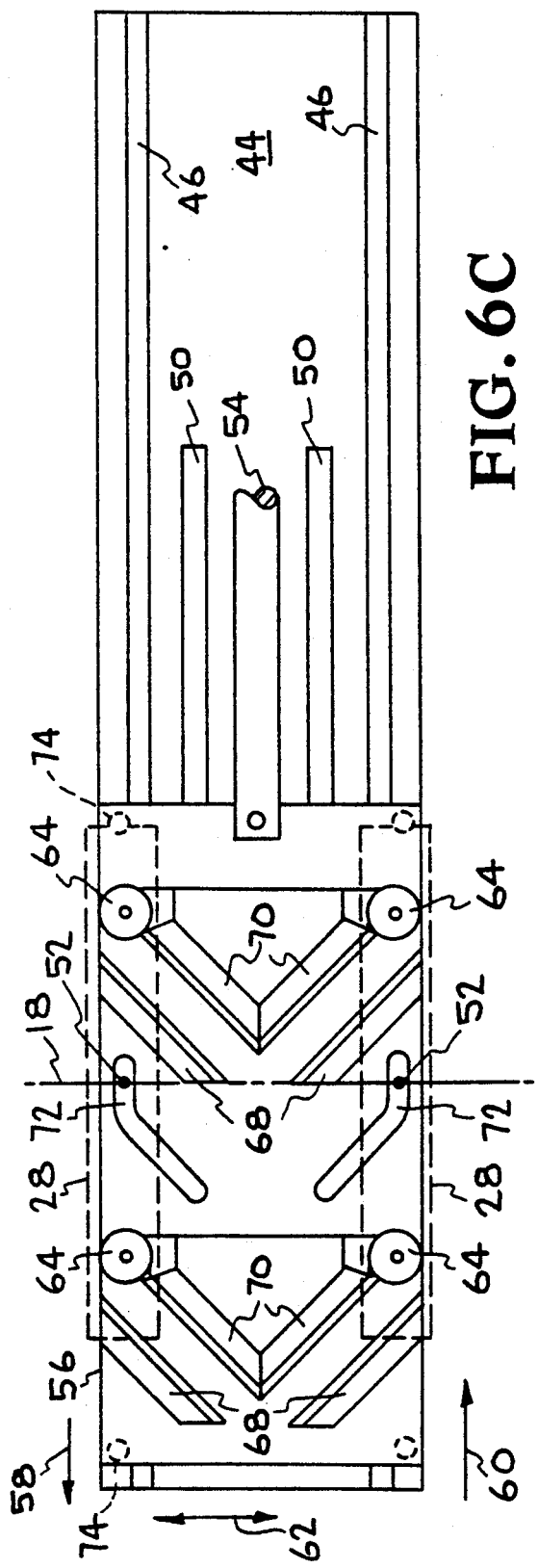
FIGS. 6 A, B, C are sectional views of the dual gate valve in the open, intermediate and closed positions, respectively, showing the translation and engagement means structure which positions and mates the seal elements.

The general operation of a dual gate valve 10 is shown in FIGS. 3 A, B, C. FIG. 3 A shows the valve 10 in the open position with a clear line of sight along axis 18 through valve openings 17 in valve body 12. Male seal element 20 is fixedly mounted to valve body 12 at valve opening 17 with sealing flange 21 extending into the interior of the valve body 12. Within the valve body 12 a stationary framework 44 is rigidly mounted to the valve body 12. The details of frame 44 are shown in FIGS. 5 and 6 A, B, C. Female sealing element 28 is moveably attached to a moveable sub-frame or carriage 56 which is connected through link 54 to valve actuator 14 which is mounted to valve body 12. Sub-frame 56 can move freely in the directions indicated by arrows 58, 60 along frame 44. The details of sub-frame 56 which move the female element 28 into contact with male element 20 are shown in FIGS. 5 and 6 A, B, C. Female sealing element 28 has recess 30 formed therein. Female sealing element 28 also has cam roll 52 extending therefrom, as more clearly shown in FIG. 4. Also mounted rigidly in valve body 12 on stationary frame 44 is translation guiding and stopping means 48 which includes "L" shaped slots 50, one side of which forms stop 49. Slot 50 has one leg which runs along valve body 12 in the direction of arrows 58, 60 to stop 49 and another leg which runs along stop 49 in the direction of axis 18. Cam roll 52 of female sealing element 28 can slide along slot 50 in the arrow 58 direction until stop 49 is reached.

To close the valve 10, sub-frame 56 is moved along stationary frame 44 in the direction of arrow 58 by means of actuator 14 through link 54. Sealing element 28 moves with the sub-frame 56. As the sub-frame 56 moves, the cam roll 52 slides along slot 50 which prevents motion of cam roll 52 (and female sealing element 28) in the direction of arrow 62 (axis 18) until stop 49 is reached. Upon reaching stop 49, cam roll 52 prevents further movement of sealing element 28 in the direction of arrow 58. In this intermediate position, illustrated in FIG. 3 B, the female sealing element 28 is in alignment with but spaced apart from the male sealing element 20.

Although stop 49 prevents further movement of sealing element 28 in the direction of arrow 58, the part of slot 50 that lies along stop 49 allows movement of element 28 in the direction of arrow 62 s that elements 20, 28 can be engaged, as shown in FIG. 3 C. While stop 49 and cam roll 52 prevent movement of element 28 in the direction of arrow 58, the sub-assembly 56 continues to move in that direction along frame 44 under the action of actuator 14. While sub-frame 56 continues to move it forces the cam roll 52 to move along slot 50 toward valve opening 17. The junction between the two legs of the "L" shaped slot 50 is rounded so the cam roll motion will be smooth and continuous. Cam roll 52 is attached to element 28 which is moveably mounted to sub-frame 56 so element 28 is moved into contact with element 20. The recess 30 of element 28 mates with flange 21 of element 20. The seal is completed by applying fluid pressure, as shown in FIGS. 2 A, B, C. To open the valve, the reverse of the above described procedure is followed. Sub-frame 56 is moved in the direction of arrow 60, after the seal pressure is released, so that element 28 is moved out of engagement with element 20 and cam roll 52 is moved back through slot 50.

Figure 4:
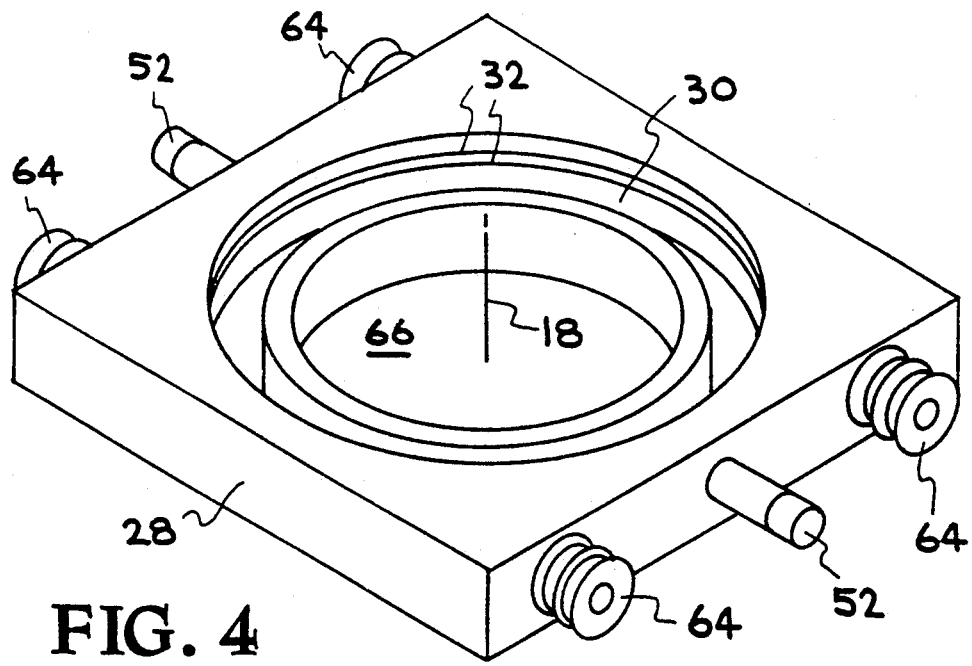
FIG. 4 is a perspective view of the female part of the metal seal of the gate valve.

As shown in FIG. 4, female sealing element 28 has a circular recess or groove 30 formed therein with a pair of raised lands or ridges 32 formed on a wall of the recess 30, as previously described. A barrier 66 closes the opening through the element 28 (as will be further described with reference to FIGS. 7 A, B). A cam roll 52 is fixedly attached and extends from each of a pair of opposed sides of element 28. A pair of v-grooved wheels 64, each having two adjacent grooves, are rotatably mounted on and extend from each opposed side along with a cam roll 52.

As shown in FIG. 5, frame 44 which is fixedly mounted inside valve body 12 includes track or rail 46 which extends along the length of body 12. Sub-frame 56 has a plurality of v-grooved wheels rotatably attached thereto which roll along track 46 so that sub-frame 56 can be moved along the length of frame 44. Sub-frame 56 also has a pair of spaced offset parallel inclined tracks or rails 68, 70 fixedly attached thereto between which the v-grooved wheels 64 attached to element 28 can roll. The sub-frame 56 also contains an inclined slot 72 through which extends cam roll 52 which is rigidly attached to element 28. Guiding and stopping means 48, with slot 50 formed therein, is fixedly mounted on frame 44, with cam roll 52 extending into slot 50. The structure and operation of tracks 68, 70 and slot 72 are further described with reference to FIGS. 6 A, B, C. Element 28 is moveably mounted to sub-frame 56 by the wheels 64 which engage the tracks 68, 70 which are rigidly attached to the sub-frame 56. Seal element 20 is rigidly attached to valve body 12. Element 28 includes a barrier 66 which closes the valve opening when the valve i sealed.

The operation of the sub-frame 56 in bringing the female sealing element 28 into position with the male sealing element is illustrated in FIGS. 6 A, B, C. In FIG. 6 A, the valve is in the open position, with a clear line of sight along the axis 18. Sub-frame 56 is moveably mounted on tracks or rails 46 of stationary frame 44 by means of wheels 74. Sub-frame 56 is moved along tracks 46 in the direction of arrow 58 by link 54. A plurality of pairs of spaced parallel inclined rails 68, 70 are fixedly attached to sub-frame 56. Rails 68, 70 are spaced apart by a distance equal to the diameter of the v-grooved wheels 64 which are rotatably mounted on element 28 so the wheels are held between the rails. The rails 68, 70 are also offset so each rail engages an adjacent groove of the wheel. The rails are oriented at an angle between the directions of arrows 58, 60 (direction of motion of sub-frame 56) and arrow 62 (or axis 18, direction of motion of element 28 relative to sub-frame 56). The lower rail 70 of the pair also has an end portion which extends in the direction of arrows 58, 60. Slot 72 formed in sub-frame 56 has an inclined portion parallel to the inclined rails 68, 70 and an end portion which extends in the direction of arrows 58, 60. The element 28 is moveably mounted on sub-frame 56 with wheels 64 engaged between rails 68, 70 and cam roll 52 at the distal end of the inclined portion of slot 72.

The element 28 moves along with sub-frame 56 in the direction of arrow 58 with cam rolls 52 in slots 50 until cam rolls 52 hit stop 49. This position is shown in FIG. 6 B.

Sub-frame 56 continues to move on wheels 74 along tracks 46 in the direction of arrow 58, but stop 49 and cam roll 52 prevent the element 28 from moving any further in the direction of arrow 58. As the sub-frame 56 moves further in the direction of arrow 58, wheels 64 and cam roll 52 attached to element 28 move up the inclines of rails 68, 70 and slot 72. Thus element 28 is held in one direction by stop 49 and cam roll 52 while it is p shed toward element 20 at the valve opening by rails 64, 70 and slot 72. The valve is closed when element 28 is brought into full engagement with element 20, as shown in FIG. 6 C with wheels 64 and cam roll 52 resting on the end portions of rail 70 and slot 72.

Figure 7B:
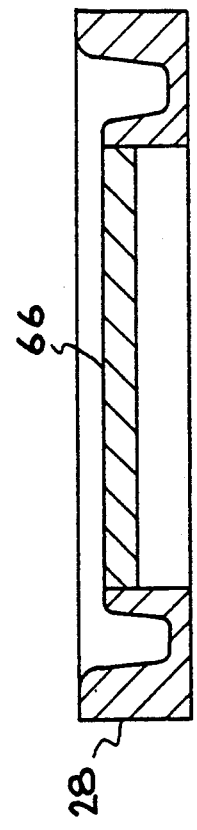
FIGS. 7 A, B are sectional views of the female part of the seal, with a dome type and a flat plate type of barrier, respectively.
Figure 7A:
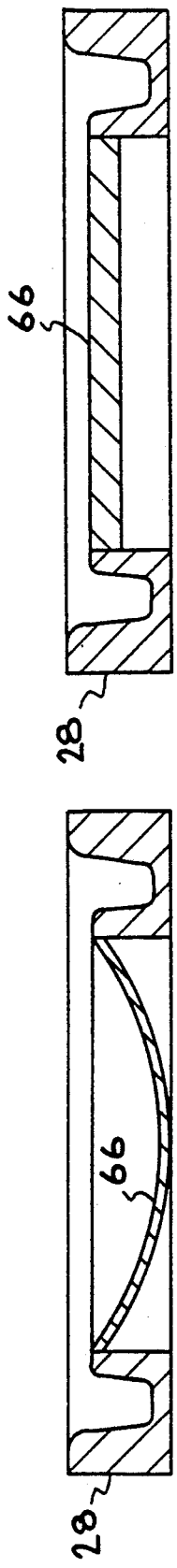

The female sealing element 28 must close off the entire valve opening when the radial directed, fluid pressure loaded, all metal seal is formed with the male element 20. The sealing element 28 may be formed of an element with a central opening which is blocked by a barrier, as shown in FIGS. 7 A, B, and as previously shown in FIGS. 4 and 5. The barrier may be a dome type barrier 66 as shown in FIG. 7 A, or alternatively as a flat plate type barrier 66 as shown in FIG. 7 B. The barrier is permanently attached, e.g. by welding.

In an illustrative 30 cm diameter valve, the male flange element is made of stainless steel and is 4.375" high and 3.5" wide, with a sealing flange portion 1.9" high and 1" wide, with a 5° taper on the outer (sealing) lateral surface and 2° taper on the inner surface. Thin wall 42 is 0.050" thick and also made of stainless steel. Annular recess 30 is 1.052" wide and 1.96" deep, and has a wall 33 made of stainless steel. Lands 32 are made of tin plated stainless steel and are 0.05" high and 0.045" wide. Gap 40 is 0.002" wide. Other embodiments include 1 m and 1.5 m diameter valves.

Although the invention has been described with respect to a dual gate valve, a single gate valve could also be built using the same principles, by eliminating the second gate.

Changes and modifications in the specifically described embodiments can be carried out without departing from the scope of the invention which is intended to be limited only by the scope of the appended claims.

I claim:

1. A gate valve comprising:
   a valve body having a valve opening therein, the valve opening defining an axis in a first direction;
   a first metal sealing means fixedly mounted to the valve body around the valve opening;
   a stationary frame fixedly mounted within the valve body;
   a moveable sub-frame moveably mounted on the stationary frame;
   a second metal sealing means moveably mounted on the moveable sub-frame, the second sealing means being mateable with the first sealing means, one of the sealing means being pressurizable to form a radial pressure seal with the other sealing means;
   valve actuation means connected to the moveable sub-frame to translate the sub-frame along the stationary frame in a second direction substantially perpendicular to the first direction;
   translation stopping means fixedly mounted in the valve body and positioned to stop the motion of the second sealing means in the second direction in a first position aligned with but spaced apart from the first sealing means as the sub-frame moves in the second direction;
   engagement forcing means on the sub-frame which in combination with the translation stopping means move the second sealing means in the first direction from the first position to a second position in engagement with the first sealing means when the sub-frame is translated along the frame in the second direction beyond the first position of second sealing means.

2. The gate valve of claim 1 wherein one of the first and second sealing means comprises a metal flange having an elastically deformable metal wall and a pressure chamber formed therein adjacent the deformable wall, and the other of the first and second sealing means comprises a member with an annular recess having a metal sealing wall and a raised metal land formed on the sealing wall and extending around the annular recess, wherein the metal flange mates with the annular recess and there is a small gap between the deformable wall of the metal flange and the raised land of the sealing wall of the annular recess when the pressure chamber is unpressurized.

3. The gate valve of claim 2 wherein the first sealing means is the metal flange and the second sealing means is the member with annular recess.

4. The gate valve of claim 3 further comprising pressurizing means connected to the pressure chamber for pressurizing the chamber to deform the deformable wall into contact with the raised metal land on the sealing wall of the recess to form a seal therebetween.

5. The gate valve of claim 4 further comprising a second raised metal land formed on the sealing wall and spaced apart from the first raised metal land.

6. The gate valve of claim 5 further comprising differential pumping means for differentially pumping the volume enclosed between the deformable wall, the raised lands, and the sealing wall.

7. The gate valve of claim 3 wherein the second sealing means further comprises a pair of cam rolls fixedly attached to the member with one cam roll on each of a pair of opposed sides of the member, and a pair of v-grooved wheels rotatably mounted on each of the opposed sides along with a cam roll.

8. The gate valve of claim 7 wherein the translation stopping means comprises an L-shaped slot having a first leg extending in the second direction and second leg extending in the first direction and a rounded junction between the legs, the first leg being positioned to slidably guide a cam roll of the second sealing means as the sub-frame translates in the second direction, the second leg being positioned to stop the translation of the cam roll in the second direction when the second sealing means reaches the first position.

9. The gate valve of claim 8 wherein the engagement forcing means comprises a plurality of pairs of spaced parallel inclined rails fixedly attached to the sub-frame, a v-grooved wheel of the second sealing means being rotatably held between a pair of inclined rails, the inclined rails being oriented in a direction between the first and second direction, and an inclined slot formed in the sub-frame which is parallel to the inclined rails and slidingly engages a cam roll, wherein as the sub-frame translates in the second direction beyond the first position of the second sealing means, the wheels of the second sealing means roll up the inclined rails and the cam roll slides up the inclined slot while the translation stopping means prevent translation of the second sealing means in the second direction, thereby moving the second sealing means in the first direction to the second position.

10. The gate valve of claim 9 further comprising pressurizing means connected to the pressure chamber for pressurizing the chamber to deform the deformable wall into contact with the raised metal land on the sealing wall of the recess to form a seal therebetween.

11. The gate valve of claim 10 further comprising a second raised metal land formed on the sealing wall and spaced apart from the first land.

12. The gate valve of claim 11 further comprising differential pumping means for differentially pumping the volume enclosed between the deformable wall, the raised lands, and the sealing wall.

13. The gate valve of claim 1 wherein the seco d sealing means further comprises a central barrier which closes the valve opening when the valve is closed.

14. The gate valve of claim 1 wherein the valve opening has a diameter of about 30 cm.

15. The gate valve of claim 1 wherein the valve opening has a diameter of about 1 m.

16. The gate valve of claim 1 wherein the valve opening has a diameter of about 1.5 m.

17. A gate valve comprising:
a valve body having a valve opening therein, the valve opening defining an axis in a first direction;
a circular metal flange having an elastically deformable metal wall and a pressure chamber formed therein adjacent the deformable wall, the flange being fixedly mounted to and extending into the valve body around the valve opening;
a stationary frame fixedly mounted within the valve body;
a moveable sub-frame moveably mounted on the stationary frame;
a recessed member with an annular recess having a metal sealing wall and a pair of spaced raised metal lands formed on the sealing wall and extending around the annual recess, the recessed member being moveably mounted on the moveable sub-frame, the annular recess being mateable with the metal flange with a small gap between the deformable wall and the raised lands when the pressure chamber is unpressurized, the recessed member having a pair of cam rolls fixedly attached thereto, one on each of a pair of opposed sides thereof, and a pair of v-grooved wheels rotatably mounted on each of the opposed sides
pressurizing means connected to the pressure chamber to deform the deformable wall into contact with the raised lands when the flange and recess are mated to form a radial pressure seal therebetween;
valve actuation means connected to the moveable sub-frame to translate the sub-frame along the stationary frame in a second direction substantially perpendicular to the first direction;
an L-shaped slot defining means fixedly mounted in the valve body and forming a first le extending in the second direction and a second leg extending in the first direction with a rounded junction therebetween, the first leg being positioned to slidably guide a cam roll as the sub-frame translates in the second direction, the second leg being positioned to stop the translation of the cam roll in the second direction with the annular recess in a first position aligned with but spaced apart from the metal flange;
a plurality of pairs of spaced parallel inclined rails fixedly attached to the sub-frame, a v-grooved wheel of the recessed member being rotatably held between a pair of inclined rails, the inclined rails being oriented in a direction between the first and second direction, and an inclined slot formed in the sub-frame which i parallel to the inclined rails and slidingly engages a cam roll, which move the annular recess in the first direction to a second position in engagement with the metal flange as the sub-frame translates in the second direction beyond the first position of the annular recess by rolling the wheel of the recessed member up the inclined rails and sliding the cam roll up the inclined slot while the second leg of the L-shaped slot prevents translation of the recessed member in the second direction.

18. The gate valve of claim 17 wherein the valve opening has a diameter between about 0.3 to 1.5 m.

* * * * *